May 13, 1969     D. LEJEUNE     3,443,721

DEVICE FOR PROTECTING VESSELS AGAINST EXCESSIVE FLUID PRESSURE

Filed Dec. 28, 1967     Sheet _1_ of 2

INVENTOR.
DANIEL LE JEUNE

BY Brumbaugh, Free, Graves & Donohue his ATTORNEYS

INVENTOR.
DANIEL LE JEUNE

United States Patent Office 3,443,721
Patented May 13, 1969

3,443,721
DEVICE FOR PROTECTING VESSELS AGAINST EXCESSIVE FLUID PRESSURE
Daniel Lejeune, Clermont-Ferrand, France, assignor to Compagnie Generale des Etablissements Michelin raison sociale Michelin & Cie, Clermont-Ferrand, Puy-de-Dome, France
Filed Dec. 28, 1967, Ser. No. 694,149
Claims priority, application France, Jan. 2, 1967, 89,731
Int. Cl. B65d 25/02
U.S. Cl. 220—89                                            6 Claims

ABSTRACT OF THE DISCLOSURE

A protective device for protecting against excessive fluid pressure includes a socket, a rupture member mounted in the socket, and an O-ring surrounding the rupture member and forming a seal between the rupture member and the socket to prevent fluid leakage between the rupture member and the socket. The rupture member includes an annular portion engaging the seal and a disk shaped portion sealing the space within the annular portion. The disk shaped portion is formed of a resin-impregnated graphite and is designed to rupture when exposed on opposite sides thereof to a differential fluid pressure exceeding a predetermined value.

Background of the invention

This invention relates to devices for protecting against excessive fluid pressure and, more particularly, to devices intended, in the event of excessive fluid pressure within a chamber, to place the chamber in communication with the outside. It concerns more especially protective devices which are miniaturized and which can, for example, either protect receptacles of small dimensions or be incorporated in small components such as valves.

Protective devices employing rupture disks made of a thin membrane sealing an opening and capable of resisting rupture only up to a given pressure are known. In particular, the use of metallic rupture disks is conventional. This type of rupture disk, however, has not been widely accepted because of its many disadvantages. On the other hand, graphite impregnated with resins, as disclosed, for example, in French Patent No. 1,421,955, has many advantages for the manufacture of rupture disks. Among the advantages of such disks are gas-tightness, chemical inertness under ordinary temperatures and conditions, resistance to thermal shock, and the precision with which the rupture pressure may be selected. Nevertheless, impregnated graphite has a serious disadvantage, arising from its variable properties under compressive forces, which prevents its being used satisfactorily for rupture disks that are miniaturized. Specifically, graphite becomes brittle when it is subjected to compression sufficient to assure a tight contact. The thinner the rupture disk the more pronounced is the increase in its brittleness when subjected to compressive forces. Excessive brittleness of the graphite has a highly deleterious effect on the performance of the portective device.

Summary of the invention

An object of this invention is to remedy the disadvantage noted above and to facilitate the use of a rupture disk made of brittle or potentially brittle material such as a resin-impregnated graphite without subjecting it to harmful strains while still obtaining a tight seal with the structure surrounding the disk.

The foregoing and other objects of the invention are attained, in a representative embodiment of a protective device in accordance with the invention, by the provision of a rupture member including an annular portion and a disk-shaped portion sealing the space within the annular portion. The rupture member is mounted in a socket and sealed to the socket by a seal, preferably torus-shaped. The seal, which may be an O-ring, surrounds the annular portion of the rupture member, bears on it, and is accommodated in a groove provided in the socket, the annular portion, or both.

The rupture member in accordance with the invention is thus efficiently held in place without subjection of the disk portion to an axial compression by the annular portion, which compression could change the rupture pressure or otherwise damage the disk portion. Furthermore, the rupture member is supported by the wall of the socket which contains it, which allows reduction of the thickness and thus of the outer diameter of the annular portion. In spite of this reduction in thickness, the annular portion retains sufficient resistance to withstand the radial compression of the surorunding seal.

In this way one may obtain rupture disks which are highly effective and which have an outer diameter which can, depending on the desired purpose, be less than 15 mm. This means that they can be lodged in supports the exterior diameter of which is less than 25 mm. and that a working surface of more than half of the overall surface can be obtained when the ratio of the inner and outer radii of the ring is more than $\sqrt{0.50}$, or about 0.7. Under these conditions, it is feasible to mount such a rupture disk for example in the base of valves intended for tires, including tires used in the aeronautic industry.

Brief description of the drawing

An understanding of additional aspects of the invention may be gained from a consideration of the following detailed description of several representative embodiments of protective devices constructed in accordance with the invention, taken in conjunction with the accompanying drawing, in which.

Description of the preferred embodiments

Figure 1:
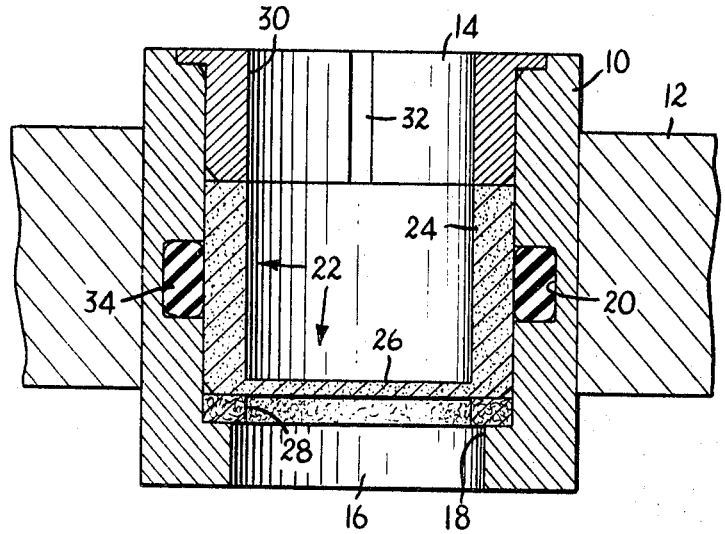
FIGURES 1–4 show in axial section four protective devices in accordance with the invention.

On FIGURE 1 a socket 10 made of metal or another suitable material has the general shape of a cylinder. The socket 10 may form part of the wall 12 of a chamber of fluid or be securely affixed to the wall 12 by any appropriate means. The socket 10 communicates at 14 with the interior of the chamber or space to be protected and at 16 with the outside, for example the atmosphere.

In the embodiment of FIGURE 1, the socket 10 is formed, adjacent to the outside 16 of the chamber, with a shoulder 18 and, at mid-height, an interior annular groove 20. In this example, the outer diameter of the socket is 16.5 mm.; its inner diameter is 11 mm. adjacent to the interior 14 of the chamber to be protected and 9.5 mm. adjacent to the outside 16 of the container. A rupture member 22 made of a resin-impregnated graphite of the type disclosed in the French patent cited above is mounted in the socket 10. It consists of an annular or cylindrical portion 24 and a disk-shaped portion 26. The outer diameter of the annular portion 24 of the rupture member 22 is substantially equal to the inner diameter of the socket 10 adjacent to the interior portion 14 of the space or chamber to be protected, while the inner diameter of the annular portion 24 is less than the inner diameter of the socket 10 adjacent to the outside of the chamber. In the case of the structure of FIGURE 1, the inner diameter of the annular portion 24 is 8 mm., the wall of the annular portion 24 having a thickness of approximately 1.5 mm., The disk-shaped portion 26 of the rupture member 22 has a thickness of about 0.5 mm., depending on the rupture pressure selected.

The rupture disk 26 is mounted adjacent to the shoulder 18 between the washer 28 for absorbtion of possible shocks, the washer 28 being made of asbestos for example, and a ring 30 which is set in the bore of the socket 10. The ring 30 is formed with a split 32 and is adapted to expand against the bore of the socket 10 to prevent accidental dislodgement of the ring 30 and rupture member 22. A tight seal between the socket 10 and the rupture member 22 and hence between the interior 14 of the closed space and the outside 16 is assured by an O-ring 34, which may be made of rubber, for example, and which is mounted in the groove 20.

The rupture disk 26 is held without being axially compressed, and its contact with the socket 10 is made tight by the O-ring, which presses against the annular portion 24 of the rupture member 22. The mounting of the rupture disk 26 prevents damage thereto notwithstanding the smallness of the dimensions. The ratio of the effective surface area of the disk 26 to the overall effective surface area of the rupture member 22 is significantly larger than 0.5.

Figure 2:
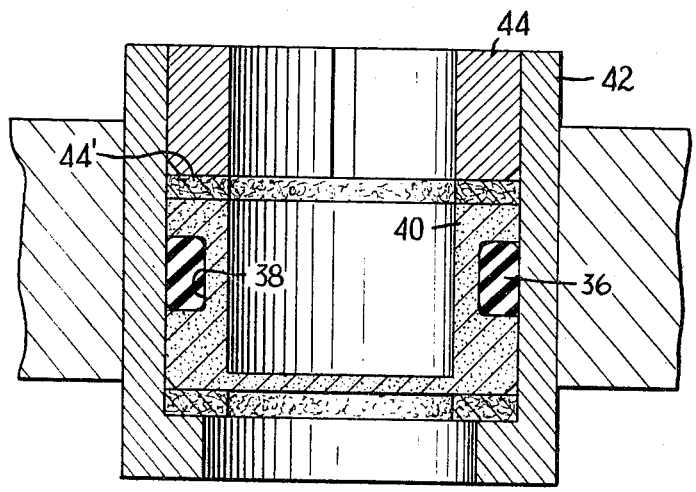

The embodiments shown in FIGURES 2, 3, and 4 differ from the embodiment of FIGURE 1 in the following ways:

In FIGURE 2, the annular groove 38 for accommodating the seal 36 is formed in the annular portion 40 rather than the socket 42, and a second washer 44' is provided between a split ring 44 and the annular portion 40.

Figure 3:
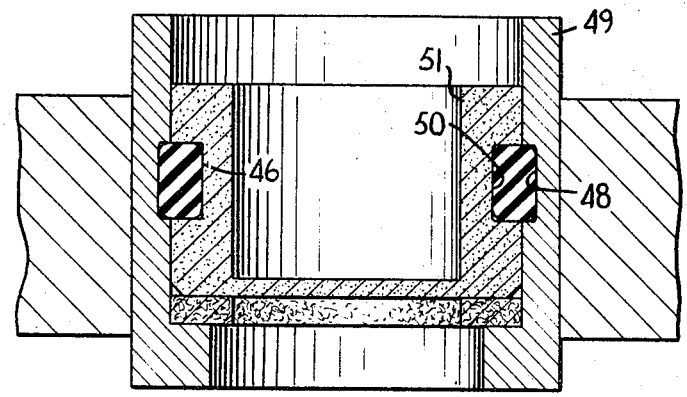
Figure 4:
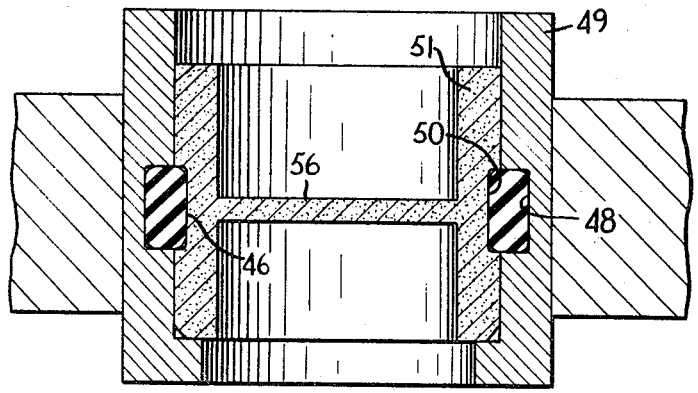

In FIGURES 3 and 4, the seal 46 is held in an annular groove 48 formed in the socket 49 opposite another annular groove 50 in the ring-shaped portion 51. By virtue of this construction, it is unnecessary to provide a split ring to retain the rupture disk in the socket 49. In these examples, the depths of grooves 48 and 50 are unequal, but they may be equal.

In the embodiment of FIGURE 4, the rupture disk 56 is located, not at the base of the cylindrical or annular portion 51 as shown in FIGURES 1, 2, and 3, but at mid-distance between the two bases of such portion. This structure provides the advantage that it protects the disk 56 better against shocks during handling of the device. No shock-absorbing washer is employed in this embodiment.

Figure 5:
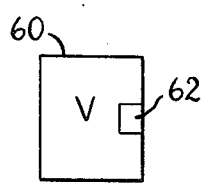
FIGURE 5 shows schematically the incorporation of one of the devices of FIGURES 1–4 in a valve.

FIGURE 5 shows schematically a valve 60 incorporating a device 62 which may be any one of the devices shown in FIGURES 1–4.

Thus there is provided in accordance with the invention a novel and highly-effective device for protecting against excessive fluid pressure. Many modifications of the disclosed embodiments will occur to those skilled in the art, and the invention is to be construed as extending to all such modifications within the scope of the appended claims.

I claim:

1. A protective device for protecting against excessive fluid pressure, comprising a socket formed with a seat, a rupture member mounted in said socket, and a sealing ring sealing said rupture member to said socket to prevent fluid leakage between said rupture member and said socket, said rupture member including an annular portion and a disk-shaped portion and being urged to a seating position in said socket by said fluid but substantially free of mechanical axial compression, said sealing ring extending around the outer circumference of said annular portion and said disk-shaped portion sealing the space within said annular portion, said disk-shaped portion being designed to rupture when exposed on opposite sides thereof to a differential fluid pressure exceeding a predetermined value.

2. A device according to claim 1 in which said disk is made of a resin-impregnated graphite.

3. A device according to claim 2 in which the outer diameter of said socket is less than 25 mm.

4. A device according to claim 2 in which the outer diameter of said disk-shaped portion is less than 15 mm.

5. A device according to claim 2 in which the ratio of the effective surface area of said disk-shaped portion to the effective surface area of said rupture member exposed to said pressure is greater than 0.5.

6. A device according to claim 1 for use in a tire or inner tube further comprising a valve having a valve base, said device being mounted in said valve base.

References Cited

UNITED STATES PATENTS 2,518,827 8/1950 Smith.
2,564,171 8/1951 Page.
2,952,383 9/1960 Paxton et al.
2,962,038 11/1960 Bird.

RAPHAEL H. SCHWARTZ, *Primary Examiner.*

U.S. Cl. X.R.

301—5